United States Patent [19]

Gondot et al.

[11] Patent Number: 5,461,534
[45] Date of Patent: Oct. 24, 1995

[54] ANTISPARKING STRUCTURE, IN PARTICULAR FOR AIRCRAFT

[75] Inventors: Pascal Gondot, Villeneuve Saint Georges; Jean-Pierre Avenet, Paris; Renaud Weber, Courbevoie, all of France

[73] Assignee: Aerospatiale Societe Nationale Industrielle, Paris, France

[21] Appl. No.: 764,715

[22] Filed: Sep. 24, 1991

[30] Foreign Application Priority Data

Oct. 30, 1990 [FR] France .................. 90 13454

[51] Int. Cl.[6] .................. H02G 13/00; H05F 3/00
[52] U.S. Cl. .................. 361/218; 174/2; 244/1 A
[58] Field of Search .................. 361/218, 212, 361/220, 117; 244/1 A, 131, 132; 174/2, 5 R

[56] References Cited

U.S. PATENT DOCUMENTS

| | | | |
|---|---|---|---|
| 3,755,713 | 8/1973 | Paszkowski | 361/218 |
| 3,989,984 | 11/1976 | Amason et al. | 244/1 A |
| 4,556,591 | 12/1985 | Bannink, Jr. | 428/43 |
| 4,839,771 | 6/1989 | Covey | 361/218 |
| 4,891,732 | 1/1990 | Jones | 361/218 |
| 5,175,665 | 12/1992 | Pegg | 361/218 |

FOREIGN PATENT DOCUMENTS

| | | |
|---|---|---|
| 0248122 | 12/1987 | European Pat. Off. . |
| 2212580 | 7/1989 | United Kingdom . |

Primary Examiner—William M. Shoop, Jr.
Assistant Examiner—Richard T. Elms
Attorney, Agent, or Firm—Fisher, Christen & Sabol

[57] ABSTRACT

An antisparking structure, in particular for aircraft, comprises two components made of composite electrically conductive material which overlie each other at least in part and which are assembled together by using an electrically conductive screw having a countersunk head. A conduction-improving arrangement is provided for improving the conduction of electricity between the overlying portions of the two components. Electrical insulation is provided for electrically insulating the screw from the second component, at least in the vicinity of the nut. Thus, when lightning strikes the head of the screw, the lightning current flows between the screw and the first component, and then between the first component and the second component through the conduction-improving arrangement, without there being any arc between the nut and the second component.

11 Claims, 1 Drawing Sheet

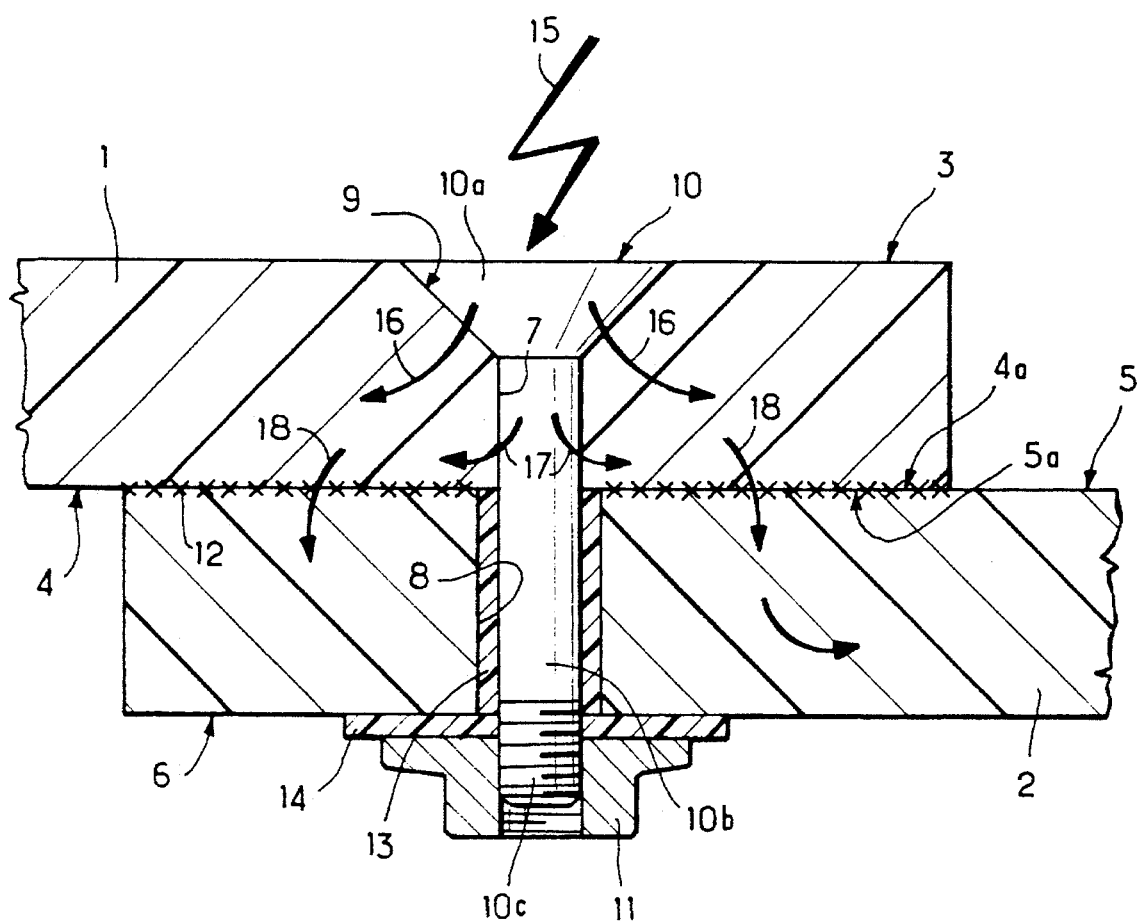

ANTISPARKING STRUCTURE, IN PARTICULAR FOR AIRCRAFT

The present invention relates to antisparking structures, in particular for aircraft.

BACKGROUND OF THE INVENTION

Structures are already known that comprise:

two components made of composite material, each having an outside face and an inside face and disposed in such a manner that the inside face of the first of said components overlies, at least in part, the outside face of the second of said components, the overlaid portions of said components including pairs of holes in alignment;

screws with countersunk heads, each screw passing through one of said pairs of holes in alignment so that its head is received in countersinking provided in the outside face of said first component; and nuts suitable for co-operating with respective ones of said screws and for bearing against the inside face of said second component to press the countersunk head of the corresponding screw into said countersinking.

When such a structure is subjected to the action of lightning, the discharge current propagates via said screws and causes arcs to appear between said nuts and the inside face of said second component. Such arcs may destroy the structure, particularly if the structure constitutes a fuel tank, in which case the arcs may ignite the fuel.

To remedy this drawback, documents U.S. Pat. No. 4,891,732 and GB-A-2 212 580 propose insulating said first and second components electrically from each other and dissipating the discharge current passing through them by facilitating the flow of said discharge current firstly between the screw heads and the first component, and secondly between the ends of said screws opposite to their heads and said second component. This results in a structure for said nuts and/or for their disposition relative to said second component that is complex.

An object of the present invention is to remedy this drawback of complexity and to make it possible to enable the structure to withstand lightning strikes while using standard nuts only.

SUMMARY OF THE INVENTION

To this end, the invention provides an antisparking structure, in particular for aircraft, comprising:

two components made of composite material, each having an outside face and an inside face and disposed in such a manner that the inside face of the first of said components overlies, at least in part, the outside face of the second of said components, the overlaid portions of said components including holes in alignment;

a screw with a countersunk head passing through said holes in alignment so that its head is received in countersinking provided in the outside face of said first component; and a nut suitable for co-operating with said screw and for bearing against the inside face of said second component to press said countersunk head into said countersinking, and remarkable in that it includes:

conduction-improving means for improving the conduction of electricity between the overlying portions of the inside face of said first component and the outside face of said second component; and electrical insulation means for electrically insulating the screw from said second component, at least in the vicinity of said nut.

Thus, when lightning strikes the head of said screw, the discharge current flows from the head thereof to said first component because of the contact with said countersinking, and from said first component to said second component because of said conduction-improving means at the interface between said first and second components. The energy of the discharge current can thus dissipate in said first and second components. In addition, because of the electrical insulation means, no arc appears between the nut and the inside face of said second component.

Said conduction-improving means at the interface between said first and second components may be constituted by an electrically conductive layer constituted by an adhesive or by a sealant. However, in a preferred embodiment, such means are constituted by an electrically conductive grid that multiplies the number of points of contact between said components and itself. Such a grid may be made of expanded metal made in such a manner as to include roughnesses or spikes that penetrate into the substance of said components, thereby constituting a corresponding number of contact points.

In addition, said electrical insulation means between the nut and said second element may be constituted by an insulating layer formed on the wall of said screw and/or on the wall of the hole in said second component. Said means may alternatively be constituted by an insulating tube surrounding said screw. For the purposes of facilitating implementation, said insulation means may extend over the entire thickness of said second component.

To further reinforce the insulation between said screw and said second component in the vicinity of said nut, it is advantageous to provide an insulating region disposed between said nut and said inside face of said second component. Like said insulation means, such an insulating region may be constituted by an insulating layer formed on said nut and/or on the inside face of said second component; alternatively the insulating region may be formed by a washer or the like disposed between the nut and the inside face of said second component.

When said insulation means and said insulating region are constituted by insulating layers respectively coated on the wall of the hole and on the inside face of said second component, or else when they are constituted respectively by a tube and by a washer, it is advantageous for them to be integral with each other, without discontinuity.

In order to further improve the flow of discharge current between the screw and said first component, it is advantageous for said screw to be of the smooth shank type with a thread being applied only to the end of the shank that is opposite to the head, and for the portion of said shank that passes through the hole in said first component to be in contact with the wall of said hole.

BRIEF DESCRIPTION OF THE DRAWING

The sole FIGURE of the accompanying drawing makes it clear how the invention can be implemented.

DETAILED DESCRIPTION

The structure of the invention shown in the sole FIGURE comprises two components 1 and 2 made of composite material, e.g. material based on carbon fibers. The component 1 has an outside face 3 and an inside face 4, while the component 2 has an outside face 5 and an inside face 6. A portion 4a of the inside face 4 of component 1 overlies a portion 5a of the outside face 5 of the component 2. In addition, facing holes 7 and 8 are formed through the portions of said components 1 and 2 respectively that overlap when said portion 4a overlies said portion 5a.

In addition, the end of the hole 7 adjacent to the outside face 3 of the component 1 is countersunk at 9.

A metal screw 10 having a countersunk head 10a and a smooth shank 10b is inserted in the facing holes 7 and 8. Only the portion of the screw 10 furthest from its countersunk head 10a includes a thread 10c. The screw 10 is such that its countersunk head 10a is an exact fit in the countersinking 9 and its shank 10b bears against the wall of the hole 7.

A nut 11, e.g. made of titanium, co-operates with the threaded portion 10c of the screw 10 and is suitable for bearing against the inside face 6 of the component 2 to press the countersunk head 10a of the screw 10 into the countersinking 9.

According to the present invention, a metal grid 12 is disposed between the overlying portions 4a and 5a of the faces 4 and 5, the grid being provided with roughnesses or points suitable for penetrating into the substance of the components 1 and 2, while an insulating tube 13 surrounds the shank 10b of the screw 10 where it passes through the hole 8 in the component 2, and an insulating washer 14 is disposed between the nut 11 and the inside face 6 of the component 2. To avoid an arc striking between the inside face 6 of the component 2 and the nut 11, the outside diameter of the washer 14 is selected to project significantly beyond the outside diameter of the nut 11.

Thus, when lightning strikes the head 10a of the screw 10, as symbolized by arrow 15, the lightning current flows initially into the component 1, firstly where the head 10a makes contact with the countersinking 9 (arrows 16), and secondly where the shank 10b makes contact with the hole 7 (arrows 17). Thereafter, the lightning current passes from the component 1 into the component 2 via the grid 12 (arrows 18). The energy of the lightning strike can thus dissipate both in the component 1 and in the component 2. In addition, no arc appears between the nut 11 and the component 2 because of the combined action of the tube of insulation 13 and of the insulating washer 14.

It will be observed that:

the grid 12 may be replaced by any other device suitable for ensuring good electrical continuity across the interface 4a–5a, e.g. an electrically conductive adhesive or sealant;

instead of being separate pieces, the tube 13 and the washer 14 may be integral with each other;

the tube 13 and the washer 14 may be replaced by insulating layers formed on the wall of the screw shank 10b, on the wall of the hole 8, and/or on the inside face 6 of the component 2 by any appropriate treatment; and the tube 13 may extend over a portion only of the thickness of the component 2 (the portion adjacent to the nut 11) instead of covering the entire length of the hole 8, as shown.

It will be understood that the present invention makes it possible for the nut 11 to be a standard nut, and it will be observed from the above description that the structure of the invention is particularly simple.

We claim:

1. An antisparking structure, in particular for aircraft, comprising:

two components made of electrical conductive composite materials, each having an outside face and an inside face and disposed in such a manner that the inside face of the first of said components overlies, at least in part, the outside face of the second of said components, the overlaid portions of said components including holes in alignment;

an electrically conductive screw with a countersunk head passing through said holes in alignment so that its head is received in countersinking provided in the outside face of said first component, said screw electrically contacting said first component;

a nut suitable for co-operating with said screw and for bearing against the inside face of said second component to press said countersunk head into said countersinking;

conduction-improving means for improving the conduction of electricity between the overlying portion of the inside face of said first component and the outside face of said second component; and electrical insulation means for electrically insulating the screw from said second component, at least in the vicinity of said nut;

whereby when lightning strikes the head of said screw, the lightning current flows between said screw and said first component, and then between said first component and said second component through said conduction-improving means, without there being any arc between said nut and said second component.

2. A structure according to claim 1, wherein said conduction-improving means are constituted by an electrically conductive layer of adhesive or sealant.

3. A structure according to claim 1, wherein said conduction-improving means are constituted by an electrically conductive grid.

4. A structure according to claim 3, wherein said grid includes roughnesses.

5. A structure according to claim 1, wherein said electrical insulation means are constituted by an insulating layer formed on said screw and/or said hole in said second component.

6. A structure according to claim 1, wherein said electrical insulation means are constituted by an insulating tube surrounding said screw.

7. A structure according to claim 1, wherein said electrical insulation means extend over the entire thickness of said second component.

8. A structure according to claim 1, wherein said electrical insulation means further include an insulating region disposed between said nut and said inside face of said second component.

9. A structure according to claim 8, wherein said insulating region is integral with the remainder of said electrical insulation means, without discontinuity.

10. A structure according to claim 1, in which said screw is of the smooth shank type with only the end thereof opposite to its head being threaded, the structure being wherein the portion of said shank that passes through the hole in said first component is in contact with the wall of said hole.

11. An antisparking structure, in particular for aircraft, comprising:

two components made of electrical conductive composite materials, each having an outside face and an inside face and disposed in such a manner that the inside face of the first of said components overlies, at least in part, the outside face of the second of said components, the overlaid portions of said components including holes in alignment;

an electrically conductive screw with a countersunk head passing through said holes in alignment so that its head is received in countersinking provided in the outside face of said first component, said screw electrically contacting said first component;

a nut suitable for co-operating with said screw and for bearing against the inside face of said second component to press said countersunk head into said countersinking;

conduction-improving means for improving the conduction of electricity between the overlying portion of the inside face of said first component and the outside face of said second component; and electrical insulation means for electrically insulating the screw and the nut from said second component;

whereby when lightning strikes the head of said screw, the lightning current flows between said screw and said first component, and then between said first component and said second component through said conduction-improving means, without there being any arc between said nut and said second component.

\* \* \* \* \*